(12) United States Patent
Fojtik et al.

(10) Patent No.: US 9,747,438 B2
(45) Date of Patent: Aug. 29, 2017

(54) ENABLING RESOURCE ACCESS FOR SECURE APPLICATION CONTAINERS

(71) Applicant: Red Hat, Inc., Raleigh, NC (US)

(72) Inventors: Michal Fojtik, Prievidza (SK); Benjamin Michael Parees, Durham, NC (US)

(73) Assignee: Red Hat, Inc., Raleigh, NC (US)

( * ) Notice: Subject to any disclaimer, the term of this patent is extended or adjusted under 35 U.S.C. 154(b) by 36 days.

(21) Appl. No.: 14/930,358

(22) Filed: Nov. 2, 2015

(65) Prior Publication Data

US 2017/0124320 A1    May 4, 2017

(51) Int. Cl.
| | | |
|---|---|---|
| *G06F 11/00* | (2006.01) | |
| *G06F 17/30* | (2006.01) | |
| *G06F 21/53* | (2013.01) | |

(52) U.S. Cl.
CPC ........ *G06F 21/53* (2013.01); *G06F 2221/033* (2013.01)

(58) Field of Classification Search
CPC .......... G06F 21/10; G06F 21/53; G06F 21/60; G06F 21/62; G06F 21/604; G06F 21/121; G06F 2221/033; H04L 63/1416
USPC .......................... 726/22–23, 26–27; 713/193
See application file for complete search history.

(56) References Cited

U.S. PATENT DOCUMENTS

| | | | | |
|---|---|---|---|---|
| 7,284,276 B2* | 10/2007 | Conover | ................. | G06F 21/55 713/165 |
| 7,293,213 B1* | 11/2007 | Xiao | ................... | G06F 11/3688 714/741 |
| 7,519,814 B2 | 4/2009 | Rochette et al. | | |
| 7,971,255 B1* | 6/2011 | Kc | ......................... | G06F 21/566 713/164 |
| 8,312,043 B2 | 11/2012 | van Riel et al. | | |
| 8,612,404 B2 | 12/2013 | Bone et al. | | |
| 8,925,090 B2* | 12/2014 | Kc | ......................... | G06F 21/566 726/2 |
| 9,152,796 B2* | 10/2015 | Gluck | ................... | G06F 21/577 |
| 9,171,169 B2* | 10/2015 | Gluck | ................... | G06F 21/577 |
| 2009/0070291 A1 | 3/2009 | Tadayon et al. | | |
| 2010/0198872 A1 | 8/2010 | Walter | | |
| 2010/0299362 A1 | 11/2010 | Osmond | | |
| 2012/0304247 A1 | 11/2012 | Badger et al. | | |

(Continued)

OTHER PUBLICATIONS

"App Sandbox Design Guide", Feb. 11, 2014, Apple, Inc.

*Primary Examiner* — Hosuk Song
(74) *Attorney, Agent, or Firm* — Lowenstein Sandler LLP

(57) ABSTRACT

Embodiments of the disclosure enable resource access for secure application containers. In accordance with one embodiment, a method is provided that comprises identifying a tracing wrapper for an application to be executed by a process. The tracing wrapper to track an event associated with an interaction of the application with one or more system resources. An instance of the application is executed by the process using an application account having access to the system resources. A first system resource of the system resources is determined to be used by the application in view of the tracing wrapper. The application is then copied to a secure container to be executed by the process using a container account of the secure container. The secure container is isolated from access to the one or more system resources. Thereupon, the container account is provided access to the first system resource.

20 Claims, 5 Drawing Sheets

(56) References Cited

U.S. PATENT DOCUMENTS

2013/0067600 A1  3/2013  Graham et al.
2014/0196122 A1  7/2014  Dar et al.
2015/0033327 A1  1/2015  Naglost et al.

* cited by examiner

ENABLING RESOURCE ACCESS FOR SECURE APPLICATION CONTAINERS

TECHNICAL FIELD

The present disclosure is generally related to computer systems, and more specifically, but without limitation, to enabling resource access for secure application containers.

BACKGROUND

Containerization is an operating-system-level virtualization environment for running multiple isolated system containers on a single host machine. It is an alternative to full machine virtualization that involves encapsulating a process into a container with its own operating environment. Some containerization technologies allow each container to run on the "bare metal" of a host machine while also being able to access a shared instance of a host operating system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

The present disclosure is illustrated by way of examples, and not by way of limitation, and may be more fully understood with references to the following detailed description when considered in connection with the figures, in which.

DETAILED DESCRIPTION

Figure 1:
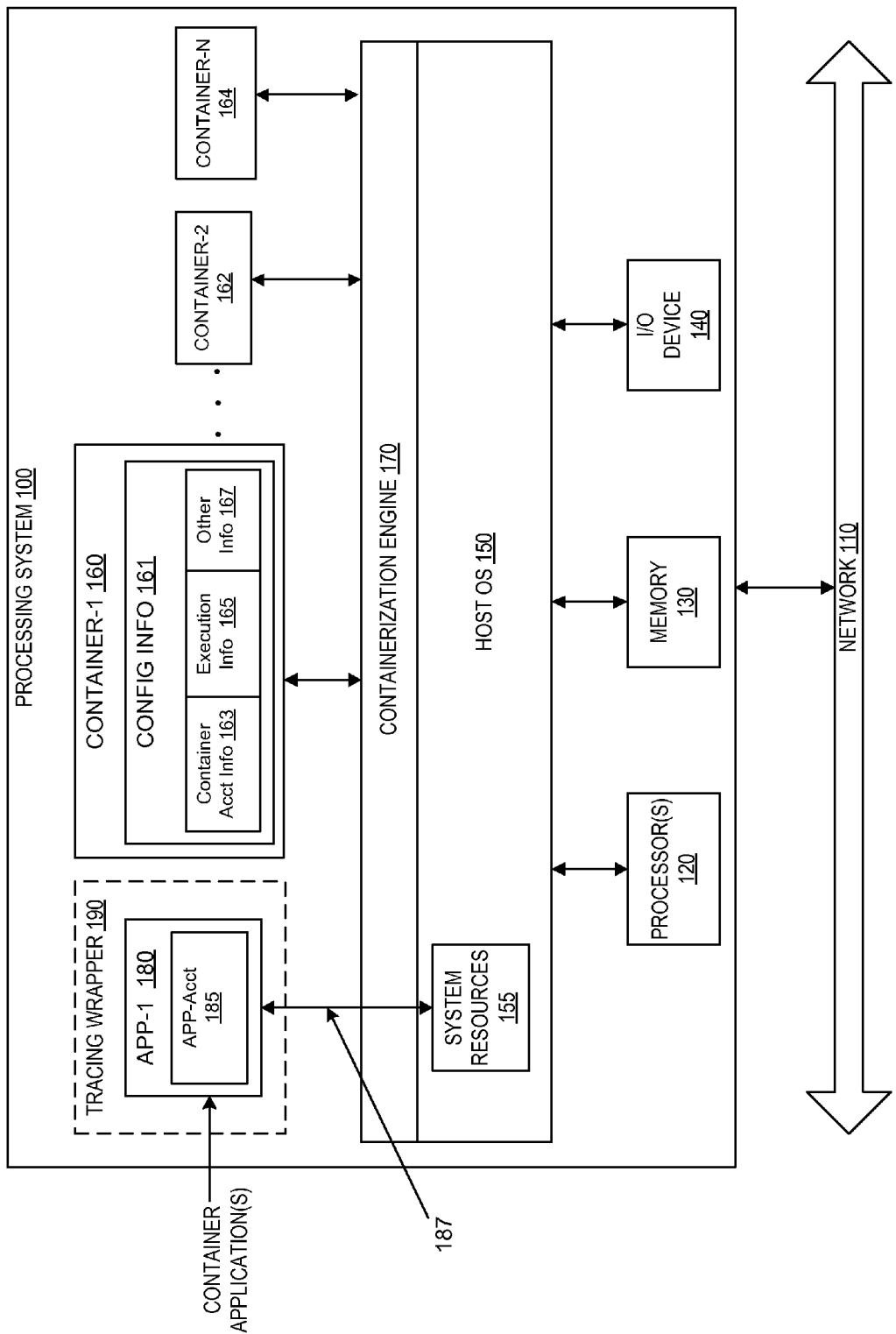
FIG. 1 illustrates a block diagram of an example processing system in accordance with one or more aspects of the present disclosure.

Embodiments of the present disclosure enable resource access for secure application containers. The term "application" is used to refer to any combination of software and hardware products that may perform a desired function. In some cases, an application may be a single software program that operates with a hardware platform. Some applications may use multiple software components, each of which may be written in a number of different programming languages and may execute a plurality of different application processes on the hardware platform.

Many containerization technologies allow application processes to run as a particular user having certain system permissions within a contained environment. In some situations, these applications can be susceptible to certain attacks that allow the processes to potentially escape the containers. In such cases, the escaped processes may have permissions on a host system associated with the container that corresponds with the user that the processes were run as within the container. Because of this, some containerization technologies may allow the application processes within a container to be run as a generic user that does not have any privileges on the host system. For instance, upon initialization of a contained environment, a container account may be created for a container to execute a software application contained therein.

Many applications, however, are configured to be executed by a specific application account with permissions to access particular host system resources (e.g., files and/or directories) that may be owned by that specific account. If such an application is executed in a container, this may result in several permission failures when the application processes attempt to access data using the container account rather than the specific application account associated with the application.

In accordance with embodiments of the present disclosure, a mechanism is provided for determining which system resources an application process needs to access when insulated inside of a secure container. In one embodiment, this mechanism may include initiating a "tracing wrapper" to be associated with a running instance of an application using its normal application account. The tracing wrapper may be a tracing application that is wrapped around the running instance of the application in order to track all resource operations performed by the running instance. Tracing generally works by placing or executing system tracing commands in the tracing application before a command to execute an instance of the application. Based on an analysis of output from the tracing wrapper, the resources that have been identified as being accessed by the application can be provisioned to allow access by a container account associated with a container. This allows the container to be secured so that the container account can successfully execute the application contained therein, thus ensuring that the application can access any needed system resources while also protecting the host system from potential attacks.

FIG. 1 illustrates a block diagram of an example processing system 100 that may be used to support secure containers in accordance with one or more aspects of the present disclosure. As shown, the processing system 100 may be coupled to a network 110 including one or more processors 120 communicatively coupled to a main memory 130 and input/output (I/O) devices 140 via, for example, a system bus.

"Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 120 is depicted in FIG. 1, in some other embodiments computer system 100 may comprise a plurality of processors. Similarly, in some other embodiments computer system 100 may comprise a plurality of I/O devices, rather than a single I/O device 140.

The processing system 100 may be a server, a mainframe, a workstation, a personal computer (PC), a mobile phone, a palm-sized computing device, etc. The network 110 may be a private network (e.g., a local area network (LAN), a wide area network (WAN), intranet, etc.) or a public network (e.g., the Internet). Computer system 100 may run "host" software, such host operating system 150 to manage the hardware and other types of system resources 155 that may include processors 120, memory 130, I/O device 140, files, directories and etc. of the computer system to provide functions such as inter-process communication, scheduling, memory and data management, and so forth.

In some embodiments, the processing system 100 may support a plurality of secure application containers, such as containers 160-164. A secure application container is a secure environment where an application, such as application 180, can be successfully executed while being insulated from the effects of other running applications not in the container. A container may have a physical presence on the processing system 100. For example, each container may be installed in memory, such as memory 130, or loaded onto an external memory device that is accessible via network 110.

The containers 160-164 may comprise one or more applications (e.g., app-1 180) executing one or more processes that may include an execution file (not shown) for starting the one or more applications therein. In operation, each container may utilize a kernel (not shown) that may be part of the host operating system 150 resident on the processing system 100. Instead of having its own operating system, each container may share the host operating system 150 for executing a corresponding application contained therein. This allows the containers 160-164 to reduce or otherwise eliminate the overhead needed to start and maintain full system virtualization, such as using virtual machines. Although multiple containers may share the same kernel, each container may be isolated from the other containers with a private view of the host operating system 150 in their own processing space of the processing system 100.

As shown in FIG. 1, host operating system 150 may include a containerization engine 170. The host operating system 150 may use the containerization engine 170 to create and manage the plurality of secure application containers 160-164. In some embodiments, the containerization engine 170 may provide the containerization functionality of the processing system 100. For instance, the containerization engine 170 may construct a container for at least one application that may include application specific installation files, binaries, libraries and configuration information, such as container configuration information 161. The containers may be then executed by the host operating system 150 of the processing system 100.

Container configuration information 161 for each of the containers may be managed by the containerization engine 170. For example, the container configuration information may be organized by the containerization engine 170 into a database (not shown) on a memory device and/or stored within each container. The container configuration information 161 may include information regarding an individual container installed on the computing platform. This may include container account information 163 used to isolate container-1 160, execution information 165 regarding how the container applications can be started and stopped and an order of execution for the application processes as well as other information 167, such as a unique identifier for the container that may include an Internet Protocol (IP), Media Access Control (MAC) address or another type of unique identifier associated with processing system 100. In other embodiments, a hashing function or other techniques of generating a unique identifier may be used.

In some embodiments, the container account information 163 may be generated by the containerization engine 170. For instance, the containerization engine 170 may generate a container account that includes an account identifier to be associated with the container. In some situations, unique container accounts may be configured for each container generated by the containerization engine 170. For example, each container account may include identifying information, such as a unique identifier, associated with a particular container.

The container account information 163 may be generated by the containerization engine 170 to help isolate the secure container 160 from the effects of other running applications and other containers (e.g., container-2 thru N 162-164) on the system 200. In one embodiment, the host operating system 150 may provide process isolation by creating separate "namespaces" for containers. Namespaces enable creating an abstraction of a particular global system resource and make it appear as a separated instance to processes within the namespace. For example, the namespace may be a set of symbols that are used to organize system objects of various kinds, so that these objects may be referred to by name. In some embodiments, the name may include the container account information 163 and the name of a particular resource. In this regard, several containers, such as containers-1 thru N 160,162,164, can use the same resource simultaneously without creating a conflict. This isolation technique helps keep the containers from adversely disrupting processing system 100 if one of the containers becomes compromised, for example, due to a hacking attack.

Each container may pass its container account information to the system kernel of host operating system 150, for example, by using a system call. In one embodiment, the container account information 163 may be used by the host operating system 150 to execute applications that are associated with corresponding container-1 160. By configuring a container application to run using a specific container account, the host processing system 100 can setup specific host resources that are permissible for access by the container. In some embodiments, those resources can be permissioned in such a way that only the container account assigned to the container can access them, thereby preventing access to the resources from any other container accounts. For example, read and write permissions for the resources can be modified by the host operating system 150 (e.g., using certain kernel commands) so that only a specific container account can access the resources.

Many applications may run on a system platform as a particular user account (e.g., mysql) with permissions to read and write to particular system resources that are presumed to be owned by that account. To ensure that the particular system resources are correctly permissioned so that the application may execute properly, embodiments of the present disclosure may determine which resources a process needs to access so that those resources can be permissioned for access by the container account associated with the application container.

To determine which resources the application may need, the containerization engine 170 may run an instance of the application to gather access information regarding any interaction of the application with the system resources 155. In one embodiment, the containerization engine 170 may send an instruction to the host operating system 150 to execute an instance of application 180. In turn, the host operating system 150 may execute the application 180 in a certain mode that has certain system access privileges. For example, the application 180 may be executed by the host operating system 150 using an application account 185 associated with the application 180. In this manner, the application 180 will be able to access any system resources 155 it needs. This allows the containerization engine 170 to gather the access information to use when creating the container.

In some embodiments, the containerization engine 170 may associate tracing wrapper 190 with application 180 to track system events that occur during the execution of the application 180. For example, the tracing wrapper 190 may be an application program or a type of programming script in which a file path-name to the application 180 is placed along with input parameters for the application 180. In one embodiment, before execution of the application 180, the tracing wrapper 190 may execute a kernel command (e.g., strace) associated with the host operating system 150 that initiates system tracing on the processing system 100. The system tracing may be used to monitor interactions indicated by arrow 187 between processes of the application 180 and the system resources 155 of processing system 100. The interactions may include system calls, signal deliveries, changes in processing states and various other types of operations. Based on output from the tracing wrapper 190, the containerization engine 170 may send commands to the host operating system 150 for provisioning the one or more resources 155 that were used by the application 180 so that a container for the application 180 may also have access to them.

Figure 2:
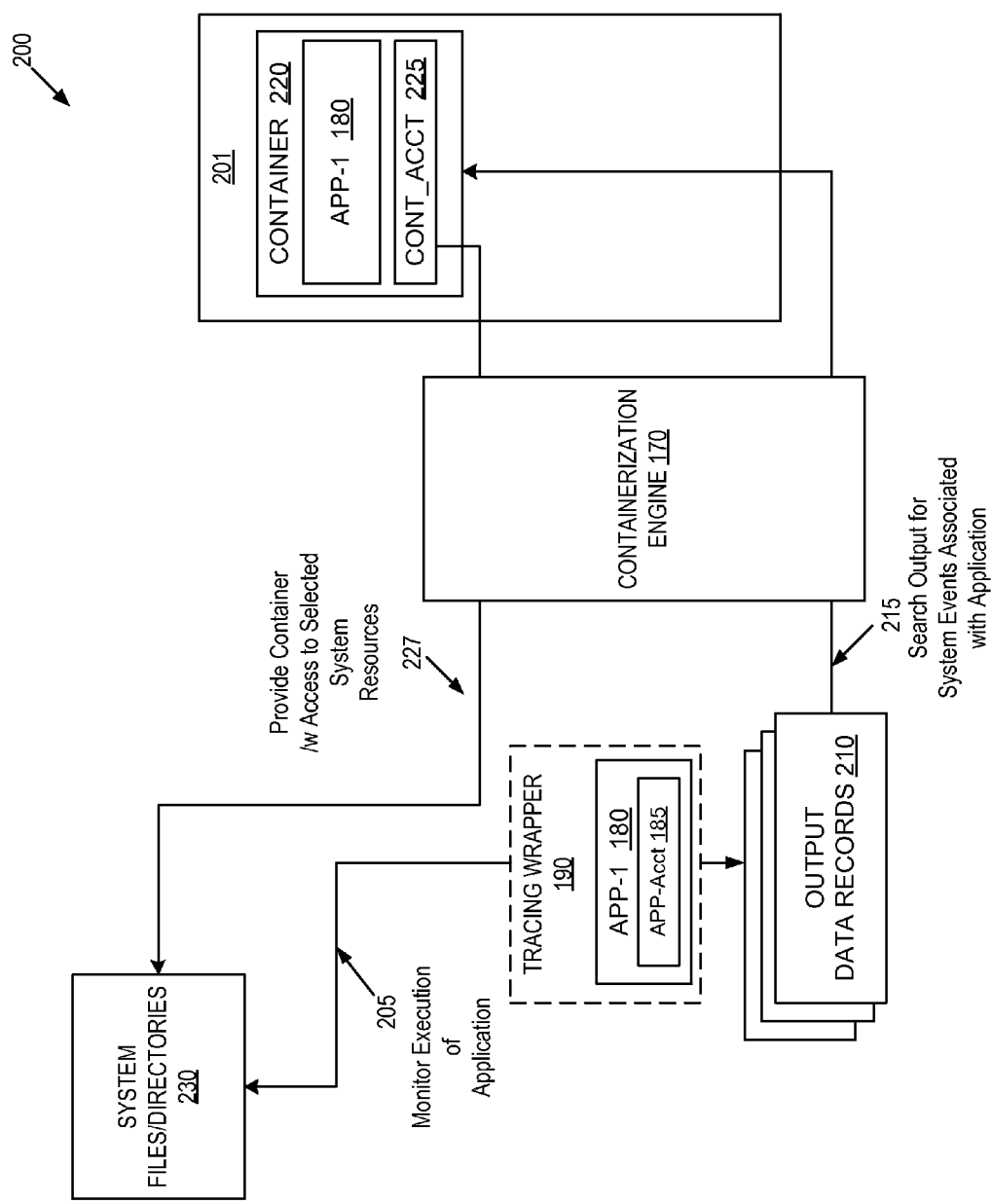
FIG. 2 illustrates a system including a memory for supporting resource access for secure application containers in accordance with one or more aspects of the present disclosure.

FIG. 2 illustrates a system 200 including a memory 201 for supporting resource access for secure application containers in accordance with one or more aspects of the present disclosure. In this example, the system 200 includes the containerization engine 170 of FIG. 1. In some embodiments, the containerization engine 170 may execute tracing wrapper 190 to gather information regarding application 180 what system resources, such as any system files and directories 230, the application needs to access. Within the tracing wrapper 190, the application 180 is executed using the application account 185 with access privileges to the system files and directors 230. For example, the application 180 may be executed by the containerization engine 170 using an application account 185 associated with an ownership of one or more resources located from among the system files and directories 230.

In operation, the tracing wrapper 190 may initiate a system tracing facility for system 200 prior to the execution of application 180. In an embodiment, the system tracing facility is actively collecting system events associated with operations executed on system 200, which may include operations executed by application 180. In some cases, the containerization engine 170 may be able to turn on and off the tracing wrapper 190 or set and update various options for the tracing wrapper 190, even after the tracing wrapper 190 is initially configured by the containerization engine 170. The tracing wrapper 190 may track the application 180 over a period of time to determine which system files and directories 230 the application 180 continues to use.

The tracing wrapper 190 may record a wide variety of event types associated with system 200. These event types may include, but are not limited to, system calls, memory and disk reads/writes, storage and memory events (e.g., accessing memory segments, communication events (e.g., socket operations, IP communications), and sending/receiving packets, file and directory operations, starting/destroying processes, exceptions, and partition-related events and etc. It should be noted that embodiments of the present disclosure are not limited to this or any particular combination of system events, and that other resource-related activity may be recorded by the tracing wrapper 190. For example, the tracing wrapper 190 may be implemented with different operating systems and may be capable of recording a plurality of different types of events.

The tracing wrapper 190 may record system events associated with system 200 in several ways. In some embodiments, tracing wrapper 190 may produce output data records 210, which include system events corresponding to operations executed by the application 180. In alternative embodiments, the tracing wrapper 190 may record the events to an output file or database that may be part of or separate from output data records 210. The containerization engine 170 may search the records 210 as indicated by arrow 215 to identify events associated with interaction of the application 180 with one or more system resources of system 200. For example, the containerization engine 170 may analyze the records 210 to identify events associated with the application account 185 used to execute the application 180. In some embodiments, the containerization engine 170 may analyze the output data records 210 to identify one or more of the system files and directories 230 that were accessed by that application account 185 in a corresponding system call. The containerization engine 170 may continue to analyze the records 210 while the application 180 is being executed within the tracing wrapper 190. After a determined period of time, the containerization engine 170 may halt execution of the tracing wrapper 190 so that the application 180 can be prepared for containerization.

To construct a container for the application 180, the containerization engine 170 may copy the application 180 to a secure location associated with system 200. For example, the containerization engine 170 may copy one or more executable files and configuration data associated with application 180 to a secure container 220 in memory 201. The secure container 220 may include a secure execution environment that is isolated from access to the system resources of system 200. For example, the secure container 220 may be associated with a container account 225, which may be configured to have a limited amount or no permissions to access the system files and directories 230 of system 200. As such, these system files or directories 230 may be located outside of the secure container 220 and stored in a location associated with system 200. By not including the system files or directories in the container 220, this allows the container 220 to be very "thin" so as to use as little space as possible when stored in memory 201.

Once the secure container 220 has been constructed by the containerization engine 170, it may be provided with access to particular system resources. For example, as indicated by arrow 227, the containerization engine 170 may provide the secure container 220 with access to one or more of the system files or directories 230 that application 180 may need for execution. In some embodiments, the containerization engine 170 may determine a permission to be associated with at least one of the system files or directories 230 in view of its analysis of output data records 210 produced by the tracing wrapper 190. These permissions may include enabling read, write, execute and/or other types of permission for a particular system resource depending on how the resource was accessed by the application 180 as determined by the tracing wrapper 190. Thereupon, the containerization engine 170 may modify the permissions of the resource for use by the application 180 within the secure container 220. For example, the containerization engine 170 may send a command to a host operating system of system 200 to update permissions of the resources with regard to the container account 225 associated with the secure container 220. In turn, the host operating system (e.g., host operating system 150 of FIG. 1) of system 200 may provision the resources for the container account 225. For example, the command may include a system call (e.g., chmod) which may change the access permissions to file system objects (e.g., files and directories) for the container account.

To ensure that system resource access permissions associated with the container 220 are kept up to date, the tracing wrapper 190 for application 180 may be re-executed. In one embodiment, the containerization engine 170 may periodically execute the tracing wrapper 190 for the application 180. In some embodiments, the containerization engine 170 may be configured to start and stop the tracing wrapper 190 at a determined time interval or a set time after the container 220 is created. In other embodiments, the containerization engine 170 may restart the tracing wrapper 190 when an update for the application 180 is received.

When the tracing wrapper 190 is restarted, the output data records 210 may be updated with a newly identified resource that is accessed by the application 180. In such a case, the containerization engine 170 may continually provide the container 220 with access to the resource. For example, the containerization engine 170 may send a command to the host operating system of system 200 to update permissions of the newly identified resource with regard to the container account 225 associated with secure container 220. Thus, the application 180 within container 220 may be provided with access to the newly identified resource(s) without the need for restarting the container 220.

Figure 3:
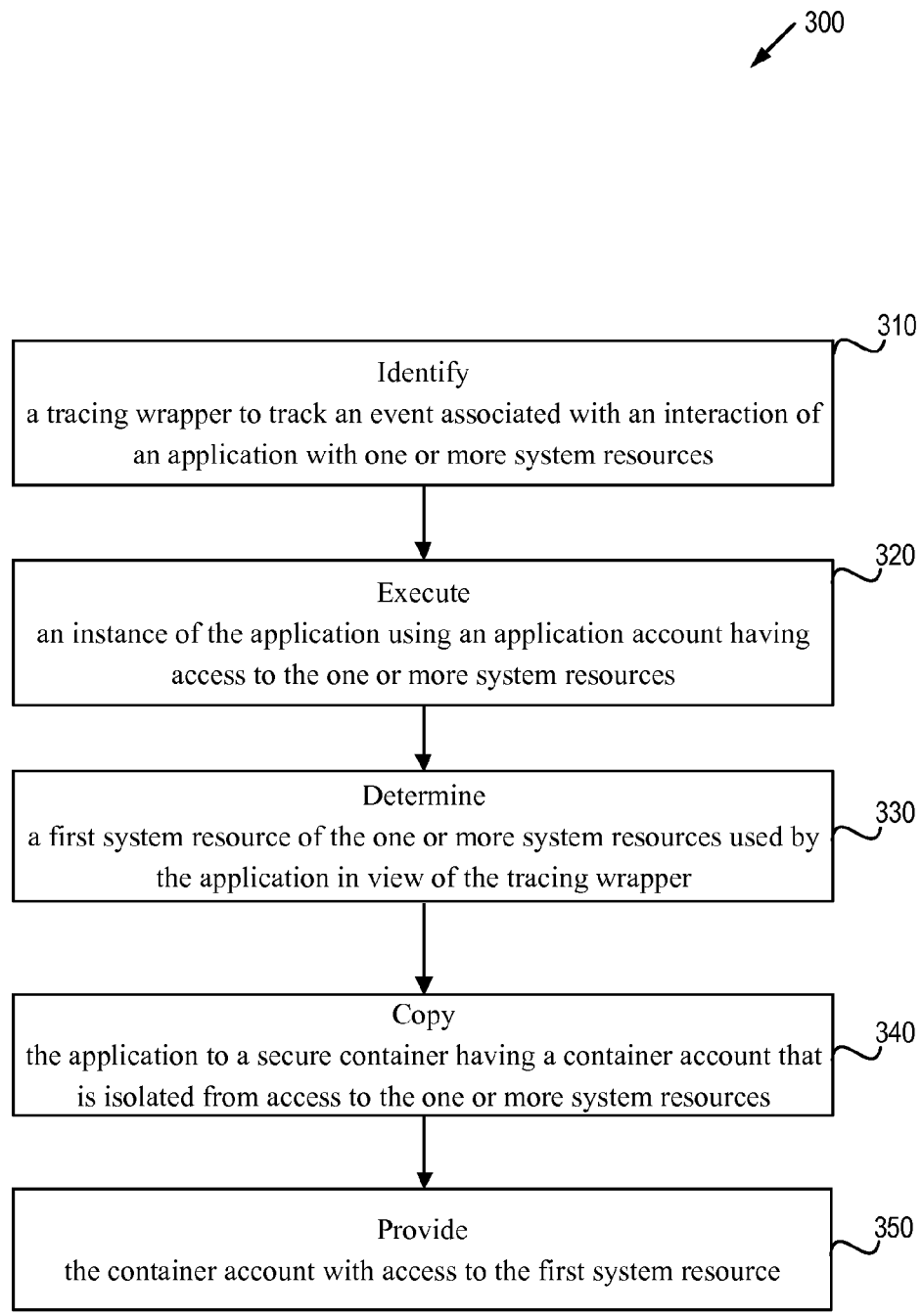
FIG. 3 illustrates a flow diagram of an exemplary method to enable resource access for secure application containers in accordance with one or more aspects of the present disclosure.

FIG. 3 depicts a flow diagram of one embodiment of a method 300 to enable resource access for secure application containers in accordance with one or more aspects of the present disclosure. In one embodiment, the containerization engine 170 of FIG. 1 may perform method 300. The method 300 may be performed by processing logic associated with the containerization engine 170 that may comprise hardware (circuitry, dedicated logic, etc.), software (e.g., software executed by a general purpose computer system or a dedicated machine), or a combination of both. In alternative embodiments, some or all of the method 300 may be performed by other components of processing system 100, such as processors 120. It should be noted that blocks depicted in FIG. 3 can be performed simultaneously or in a different order than that depicted.

Method 300 begins at block 310 where a tracing wrapper is identified that tracks an event associated with an interaction of an application with one or more system resources. At block 320, an instance of the application is executed using an application account having access to the one or more system resources. At block 330, a first system resource of the one or more system resources is determined to be used by the application in view of the tracing wrapper. For example, output from the tracing wrapper may be analyzed to identify system events of the application associated with the access of certain files and directories. The application is then copied to a secure container having a container account that is isolated from access to the one or more system resources at block 340. Thereupon, the container account is provided with access to the first system resource at block 350.

Figure 4:
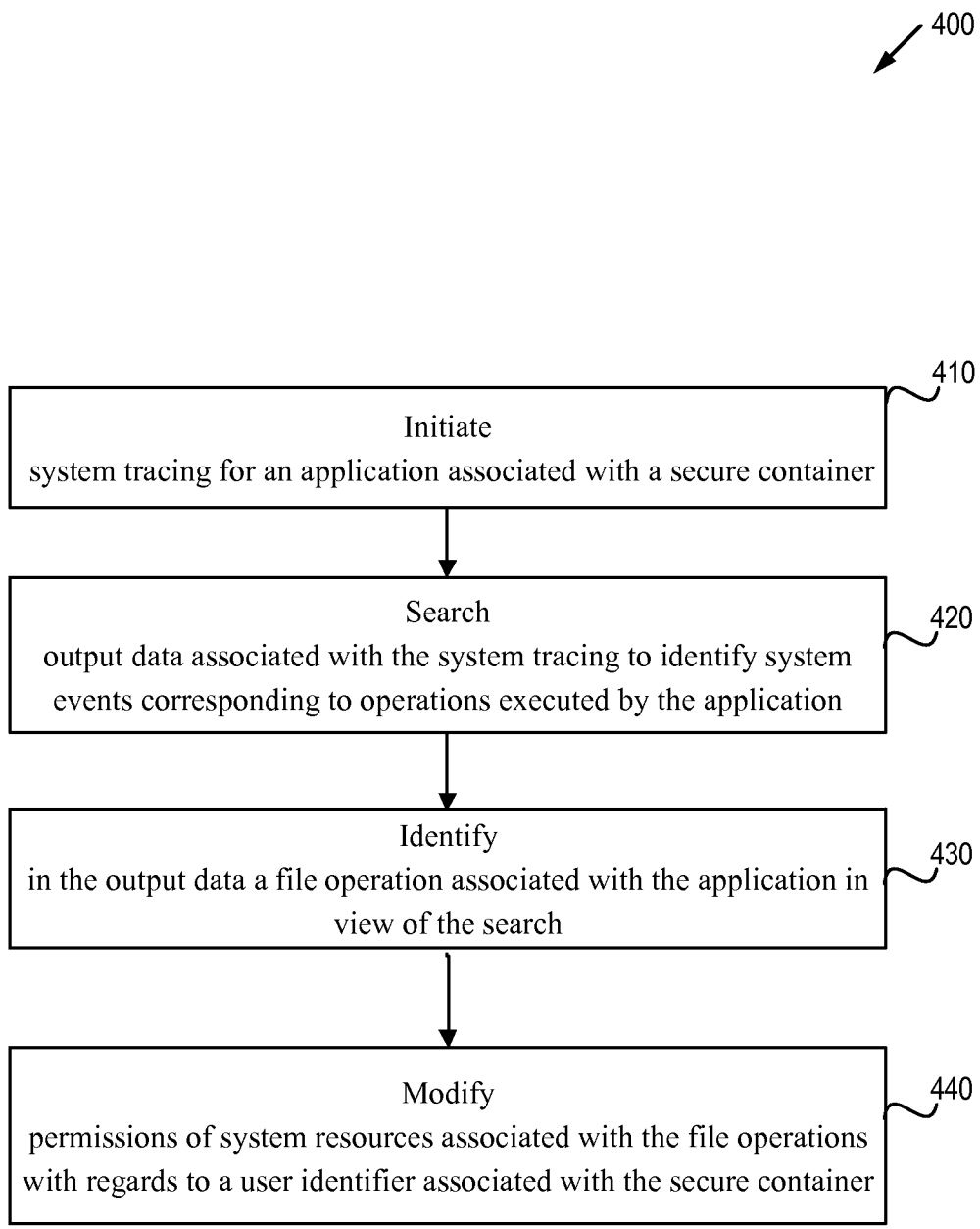
FIG. 4 illustrates a flow diagram of a method to track resource permissions for application containers in accordance with one or more aspects of the present disclosure.

FIG. 4 depicts a flow diagram of one embodiment of a method 400 to track resource permissions for application containers in accordance with one or more aspects of the present disclosure. In one embodiment, the containerization engine 170 of FIG. 1 may perform method 400. The method 400 may be performed by processing logic associated with the containerization engine 170 that may comprise hardware (circuitry, dedicated logic, etc.), software (e.g., software executed by a general purpose computer system or a dedicated machine), or a combination of both. In alternative embodiments, some or all of the method 400 may be performed by other components of processing system 100, such as processors 120. It should be noted that blocks depicted in FIG. 4 can be performed simultaneously or in a different order than that depicted.

Method 400 begins at block 410 where system tracing for an application associated with a secure container is initiated. At block 420, output data associated with the system tracing is searched to identify system events corresponding to operations executed by the application. For example, the system tracing may record output data to a file or other types of similar non-transitory computer readable mediums. At block 430, a file operation associated with the application in view of the search is identified in the output data. For example, the file operation may include a system call to access a particular file or directory. Thereafter, permissions of system resources associated with the file operations are modified at block 440 with regard to a user identifier associated with the secure container. For example, a kernel command, such as chmod, may be executed to change the access permissions for the file and/or directory associated with the file operation.

Figure 5:
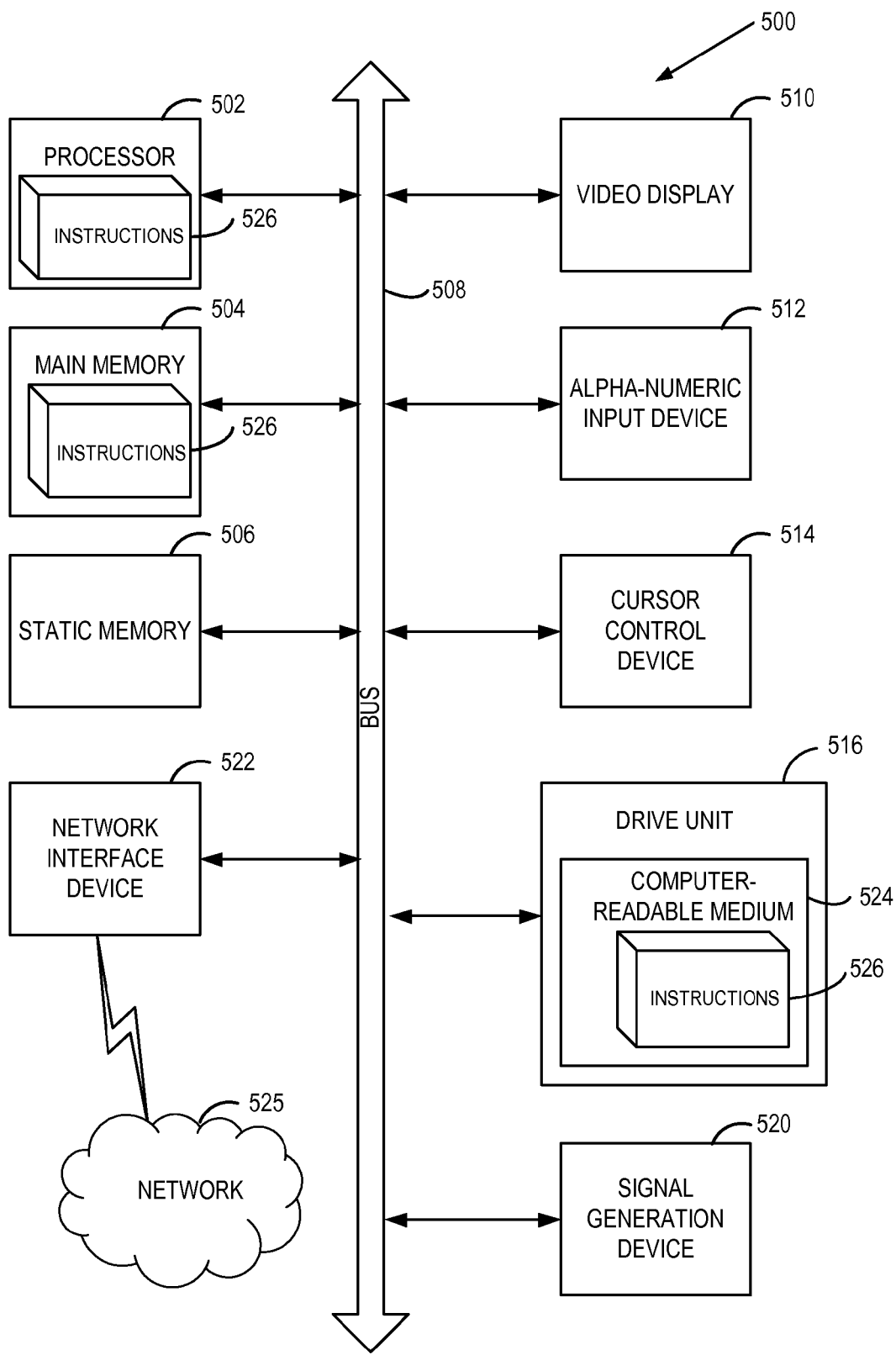
FIG. 5 illustrates a block diagram illustrating a computer system in which an embodiment of the disclosure may be used.

FIG. 5 depicts an example computer system 500 which can perform any one or more of the methods described herein. In one example, computer system 500 may correspond to processing system 100 of FIG. 1 for enabling resource access for secure application containers. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing system (processor) 502, a main memory 504 (e.g., read-only memory (ROM), flash memory, random access memory (DRAM) such as synchronous DRAM (SDRAM)), a static memory 506 (e.g., flash memory, static random access memory (SRAM)), and a drive unit 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions that may include instructions to execute instructions 526 for performing the operations and steps discussed herein. For example, in one embodiment, the instructions 526 may perform any one of the methods 300 of FIGS. 3 and 400 of FIG. 4.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The drive unit 516 or secondary memory may include a computer-readable medium 524 on which is stored one or more sets of instructions 526 (e.g., instructions for the instructions 526.) embodying any one or more of the methodologies or functions described herein. Instructions for the instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522. The instructions 526 may further be transmitted or received over a network 525 via the network interface device 522.

The non-transitory computer-readable storage medium 524 may also be used to store the instructions 526 persistently. While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, non-transitory computer-readable storage mediums, solid-state memories, optical media, and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 525 from which it may receive and provide relevant information regarding geometries.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "determining", "executing", "copying", "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   identifying, by a processor, a tracing wrapper for an application to be executed by the processor, the tracing wrapper to track an event associated with an interaction of the application with one or more system resources;
   executing, by the processor, an instance of the application using an application account having access to the one or more system resources;
   determining, by the processor, a first system resource of the one or more system resources used by the application in view of the tracing wrapper;
   copying, by the processor, the application to a secure container to be executed by the processor using a container account associated with the secure container, the secure container is isolated from access to the one or more system resources; and
   providing, by the processor, the container account with access to the first system resource of the one or more system resources.

2. The method of claim 1, wherein identifying the tracing wrapper further comprises initiating for the application.

3. The method of claim 2, further comprising tracking output data associated with the system tracing to identify system events corresponding to operations executed by the application.

4. The method of claim 3, further comprising searching the output data for the event associated with the interaction of the application with the one or more system resources.

5. The method of claim 4, further comprising identifying a file operation associated the application in view of the searching.

6. The method of claim 1, further comprising determining a permission to be associated with the first system resource in view of the tracing wrapper.

7. The method of claim 6, further comprising modifying the permission with regard to the container account associated with the secure container.

8. A system comprising:
   a memory to store a secure container; and
   a processor, operatively coupled to the memory, to:
      identify a tracing wrapper for an application to be executed by the processor, the tracing wrapper to track an event associated with an interaction of the application with one or more system resources;
      execute an instance of the application using an application account having access to the one or more system resources;
      determine a first system resource of the one or more system resources used by the application in view of the tracing wrapper;
      copy the application to the secure container to be executed by the processor using a container account associated with the secure container, the secure container is isolated from access to the one or more system resources; and
      provide the container account with access to the first system resource of the one or more system resources.

9. The system of claim 8, wherein to identify the tracing wrapper, the processor is further to initiate system tracing for the application.

10. The system of claim 9, wherein the processor is further to track output data associated with the system tracing to identify system events corresponding to operations executed by the application.

11. The system of claim 10, wherein the processor is further to search the output data for the event associated the interaction of the application with the one or more system resources.

12. The system of claim 11, wherein the processor is further to identify a file operation associated the application in view of the searching.

13. The system of claim 8, wherein the processor is further to determine a permission to be associated with the first system resource in view of the tracing wrapper.

14. The system of claim 13, wherein the processor is further to modify the permission with regard to the container account associated with the secure container.

15. A non-transitory computer-readable storage medium comprising executable instructions that when executed, by a processor, cause the processor to:
   identify, by the processor, a tracing wrapper for an application to be executed by the processor, the tracing wrapper to track an event associated with an interaction of the application with one or more system resources;
   execute an instance of the application using an application account having access to the one or more system resources;
   determine a first system resource of the one or more system resources used by the application in view of the tracing wrapper;
   copy the application to a secure container to be executed by the processor using a container account associated with the secure container, the secure container is isolated from access to the one or more system resources; and provide the container account access to the first system resource of the one or more system resources.

16. The non-transitory computer-readable storage medium of claim 15, wherein to identify the tracing wrapper, the executable instructions further cause the processor to initiate system tracing for the application.

17. The non-transitory computer-readable storage medium of claim 16, wherein the executable instructions further cause the processor to track output data associated with the system tracing to identify system events corresponding to operations executed by the application.

18. The non-transitory computer-readable storage medium of claim 17, wherein the executable instructions further cause the processor to search the output data for the event associated the interaction of the application with the one or more system resources.

19. The non-transitory computer-readable storage medium of claim 18, wherein the executable instructions further cause the processor to identify a file operation associated the application in view of the searching.

20. The non-transitory computer-readable storage medium of claim 15, wherein the executable instructions further cause the processor to determine a permission to be associated with the first system resource in view of the tracing wrapper.

* * * * *